Nov. 27, 1934.  R. B. LEWIS  1,981,960
TORSION TESTING MECHANISM
Filed Nov. 28, 1933   2 Sheets-Sheet 1
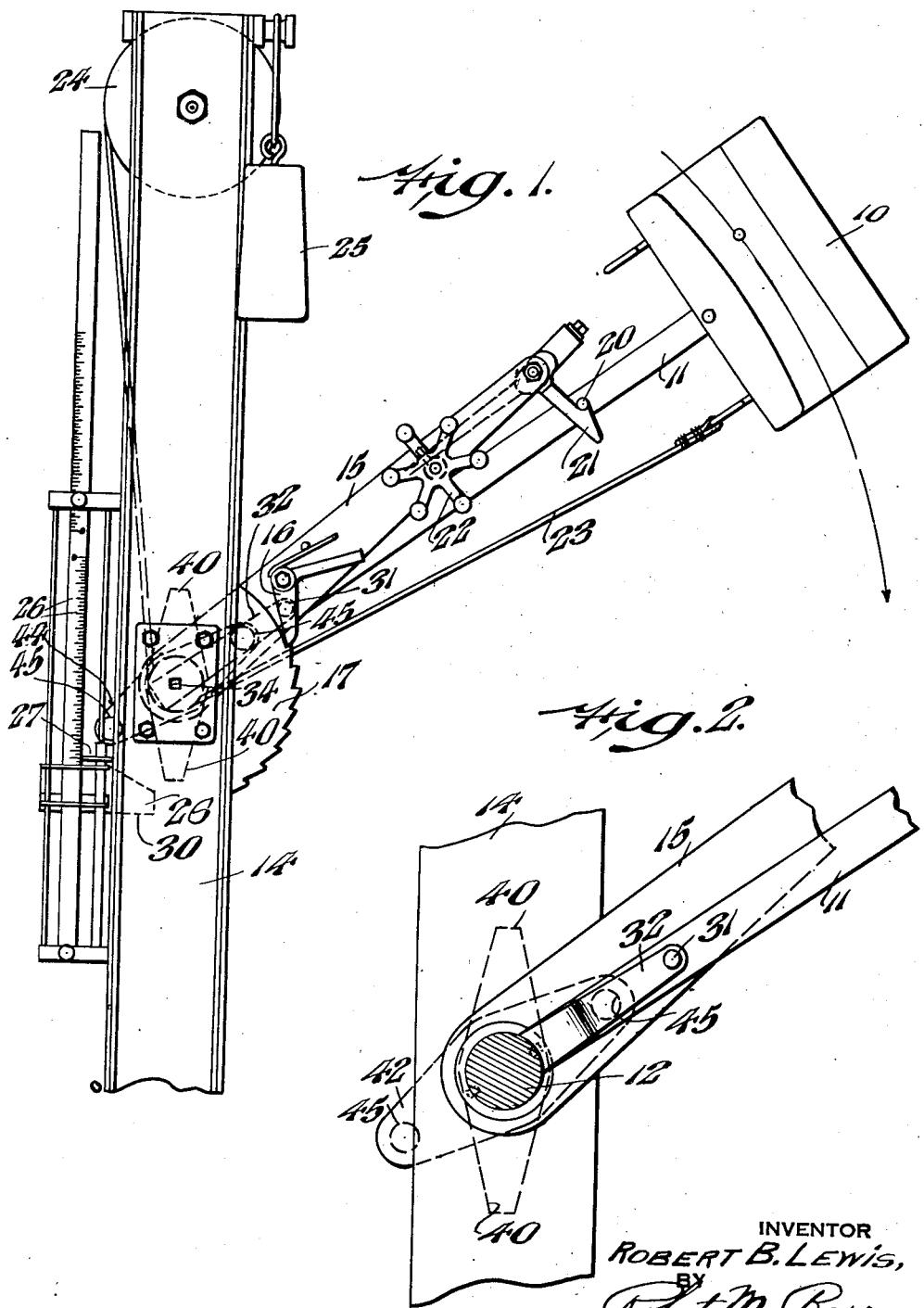
INVENTOR
ROBERT B. LEWIS,
BY
Robert M. Barr,
ATTORNEY

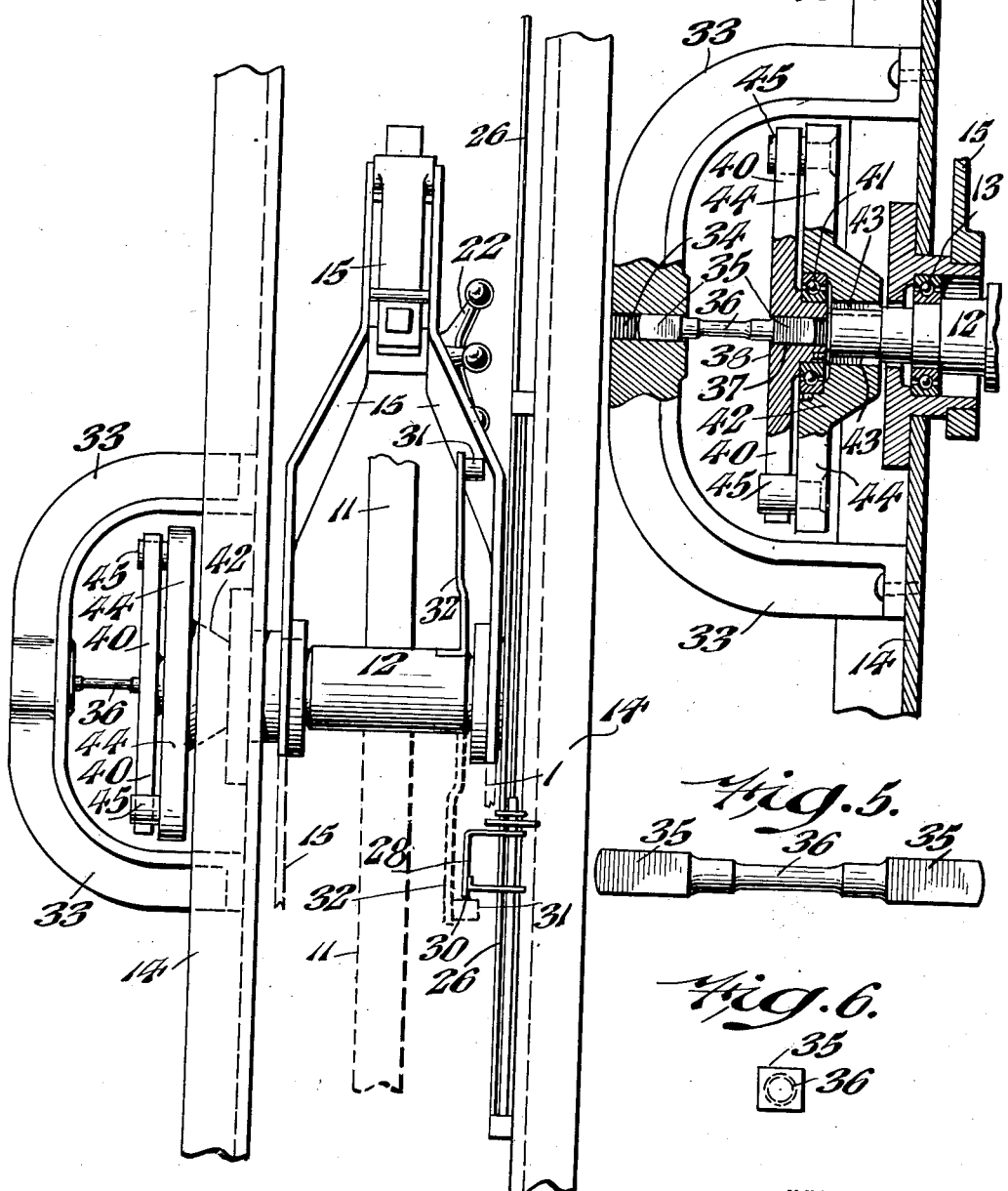

Patented Nov. 27, 1934

1,981,960

UNITED STATES PATENT OFFICE 1,981,960

TORSION TESTING MECHANISM

Robert B. Lewis, Philadelphia, Pa., assignor to Tinius Olsen Testing Machine Company, Philadelphia, Pa., a corporation of Pennsylvania Application November 28, 1933, Serial No. 700,045

6 Claims. (Cl. 265—17)

The present invention relates to testing machines and more particularly to a pendulum impact machine for torsion testing.

Some of the objects of the present invention are to provide an improved apparatus for testing materials for torsional strength; to provide a novel mechanism for torsion testing using a pendulum impact testing machine; to provide means for obtaining a direct reading of the impact energy spent in performing a torsion test; to provide as a part of a pendulum impact testing machine an auxiliary unit for making torsion tests and which can be operated at will without requiring any change or replacement of parts and which does not interfere with the operation of the machine for breaking or other tests, and to provide other improvements as will hereinafter appear.

In the accompanying drawings Fig. 1 represents a front elevation of a portion of a pendulum impact testing machine embodying one form of the present invention; Fig. 2 represents a detail in part section of the pendulum mounting and the indicator operating means; Fig. 3 represents a side elevation on an enlarged scale of the torsion testing unit and associated parts; Fig. 4 represents, on a still larger scale and in part section, the torsion testing unit; Fig. 5 represents a side elevation of a test specimen; and Fig. 6 represents an end elevation of the test specimen.

Referring to the drawings one form of the present invention built into a pendulum impact testing machine of the general character illustrated and described in United States Letters Patent No. 1,780,696 is shown. In this type of machine a pendulum weight 10 is mounted for free swinging movement by having its arm 11 fixed to a stub shaft 12 which is preferably freely rotatable in ball bearings 13. These bearings 13 are respectively supported in the rigid side frame bars 14 of the machine and the arrangement is such that the pendulum 10 can swing between the bars 14 for impact tests. A bifurcated arm 15 straddles the hub part of the pendlum arm 11 and is mounted coaxially of the shaft 12 for movement relative thereto when desired. This arm 15 by its angular adjustment can determine the initial or selected height from which the pendulum is to drop, the adjustment being made possible by a spring pressed pawl 16 carried by the arm 15 in position to engage a ratchet segment 17 which is fast to one of the bars 14. With this height adjustment set the arm 15 becomes a rigid support holding the pendulum rod 11 in the selected position by means of a fixed pin 20 on the rod 11 and a releasable latch 21 pivoted to the arm 15. A hand wheel mechanism 22 is arranged to control the latch 21 for release purposes.

A take-up rope 23, pulley 24, and weight 25 are provided to stop the swing of the pendulum after it has completed its test stroke. This mechanism is understood in the art as well as the indicating means by which the impact energy can be read directly. This latter consists of a vertically mounted scale 26 arranged for adjustment for zero setting and having a movable pointer or index 27 which is actuated by an attached part 28 having a straight edge 30 located in the path of a roller 31. A radially disposed arm 32, fixed to the shaft 12, carries the roller 31 so that the latter picks up the edge 30 at the moment of impact and thus causes the index 27 to rise to the position corresponding to the new height determined by the energy consumed by the resistance of the test specimen.

For the purpose of making a torsion test, a yoke 33 having a bore 34 therein is rigidly fastened to one of the frame bars 14 with the bore 34 in alinement with the shaft 12. The sectional shape of the bore 34 is square to conform to the square end 35 of the test specimen 36 so that the latter can be held against turning movement. The opposite end 35 is arranged to seat in a like square bore 37 formed at the center of a torsion applying hub 38 having two diametrically disposed anvil arms 40. The hub 38 is mounted on a ball race 41 within the hub of a striker member 42, the arrangement being such that the two parts 38 and 42 have relative movement but can also move together. The member 42 is keyed by keys 43 to the shaft 12 and has arms 44 diametrically disposed and respectively mounting impact rollers 45 which project laterally into the plane of the arms 40, one at one side of one arm 40 and the other at the opposite side of the other arm 40. The location of the two striker rollers 45 is such that there is a simultaneous impact with the arms 40 when the striker member 42 is turned by the swing of the pendulum.

In carrying out a torsion test in the machine of the present invention, the specimen 36 is inserted through the bore 34 in the yoke 33 to take the position shown in Fig. 4, that is with the two square ends 35 snugly seated in the bores 34 and 37. The pendulum 11 is raised to the selected height from which it is to be released for its impact stroke and is there held elevated by the latch 21 engaging under the pin 20. The aforesaid selected height is obtained by setting the pawl 16 in the proper notch of the ratchet 17, and the arm 15 then becomes a fixed support to hold the pendulum elevated at the desired height. The test can then be made by manually turning the hand wheel 22 to release the latch 21 so that the weight 10 swings downward, turning the shaft 12 and causing a corresponding swing of the impact member 42. At the lowest point of travel of the weight 10 the lugs or rollers 45 of the impact member 42 simultaneously strike the arms 40 to cause the hub or body 38 to turn with the impact member 42. This causes the desired torsional force to be applied to the specimen 36 and the consequent breaking of the same. Also when the pendulum swings past its lowest point the roller 31 contacts with the straight edge 30 to thereby elevate the scale index 27 to the point corresponding to the loss of energy due to the resistance of the test piece, it being understood that the zero setting of the scale corresponds to the highest swing of the pendulum without any imposed resistance.

While only a single form is shown in which this invention may be embodied, it is to be understood that the invention is not limited to any specific construction, but might be applied to various forms without departing from the spirit of the invention or the scope of the appended claims.

Having thus described my invention, I claim:—

1. A testing apparatus comprising the combination of a frame, a pendulum mounted to swing on said frame, an impact member connected to follow the movement of said pendulum, means holding one end of a test specimen fixed against rotation, a torsion element, means for transferring a turning movement of said element to the other end of said test piece, and means arranged in the path of said impact member for causing the motion of said impact member to be transmitted to said torsion element at a predetermined point in the travel of said pendulum.

2. A testing apparatus comprising the combination of a frame, a pendulum mounted to swing on said frame, an impact member connected to follow the movement of said pendulum, means holding one end of a test specimen fixed against rotation, a torsion element, means for transferring a turning movement of said element to the other end of said test piece, means arranged in the path of said impact member for causing the motion of said impact member to be transmitted to said torsion element at a predetermined point in the travel of said pendulum, and an indicator operated by said pendulum.

3. A testing apparatus comprising the combination of a frame, a pendulum mounted to swing on said frame, means holding one end of a test specimen fixed against rotation, a device connected to the other end of said specimen and arranged to apply torque thereto, and means to transmit the motion of said pendulum to said device at a predetermined point in the travel of said pendulum.

4. A testing apparatus comprising the combination of a frame, a pendulum mounted to swing on said frame, means holding one end of a test specimen fixed against rotation, a device connected to the other end of said specimen and arranged to apply torque thereto, means to transmit the motion of said pendulum to said device at a predetermined point in the travel of said pendulum, and an indicator operated by said pendulum.

5. A testing apparatus comprising the combination of two fixed frames arranged in spaced apart relation, a shaft between said frames having its ends respectively journalled therein, a pendulum fixed to said shaft, an impact member keyed to said shaft on the outside of one frame, a fixed yoke about said impact member, means to mount one end of a test specimen against rotation in said yoke and with said specimen coaxially disposed with respect to said shaft, a holder for the other end of said specimen and arranged to apply torque thereto, and means for transmitting the motion of said impact member to said holder at a predetermined point in the travel of said pendulum.

6. A torsion testing mechanism comprising a frame, a shaft journalled therein, an impact member mounted to rotate with said shaft, a torsion element having a bore of polygonal section to snugly seat the correspondingly shaped end of a test specimen, means to mount said element for rotation, a fixture for holding the opposite end of said specimen against rotation, a pendulum mounted to turn said shaft as it swings from one position to another, and means for transmitting the movement of said impact member to said torsion element at a predetermined point in the travel of said pendulum.

ROBERT B. LEWIS.